United States Patent
Fisher et al.

(10) Patent No.: US 8,173,324 B2
(45) Date of Patent: May 8, 2012

(54) CATALYST

(75) Inventors: Janet Mary Fisher, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 291 days.

(21) Appl. No.: 12/670,000

(22) PCT Filed: Jul. 22, 2008

(86) PCT No.: PCT/GB2008/050611
§ 371 (c)(1), (2), (4) Date: Jan. 21, 2010

(87) PCT Pub. No.: WO2009/013540
PCT Pub. Date: Jan. 29, 2009

(65) Prior Publication Data
US 2010/0196789 A1 Aug. 5, 2010

(30) Foreign Application Priority Data
Jul. 25, 2007 (GB) .................................. 0714460.3

(51) Int. Cl.
| B01J 21/18 | (2006.01) |
| B01J 23/42 | (2006.01) |
| B01J 23/48 | (2006.01) |
| B01J 35/02 | (2006.01) |
| H01M 4/92 | (2006.01) |
| H01M 8/10 | (2006.01) |

(52) U.S. Cl. ............ 429/483; 429/524; 502/4; 502/325; 502/326

(58) Field of Classification Search ................... 429/483, 429/524; 502/4, 325, 326
See application file for complete search history.

(56) References Cited

U.S. PATENT DOCUMENTS
| 7,709,413 B2 * | 5/2010 | Yoshida et al. ............... 502/313 |
| 2005/0075240 A1 | 4/2005 | Yamamoto |
| 2005/0233183 A1 | 10/2005 | Hampden-Smith et al. |

FOREIGN PATENT DOCUMENTS
| EP | 0 450 849 A2 | 10/1991 |
| EP | 0 450 849 A3 | 10/1991 |
| EP | 0 731 520 A1 | 9/1996 |
| EP | 0 875 524 A2 | 11/1998 |
| EP | 0 875 524 A3 | 11/1998 |
| GB | 2 185 347 A | 7/1987 |
| WO | WO-2005/020356 A1 | 3/2005 |
| WO | WO-2006/021740 A1 | 3/2006 |

* cited by examiner

Primary Examiner — Timothy Vanoy
(74) Attorney, Agent, or Firm — RatnerPrestia

(57) ABSTRACT

A platinum alloy catalyst PtX, wherein the atomic percent of platinum in the bulk alloy is from 5 to 50 at %, the remaining being X, characterised in that the atomic percent of platinum at the surface of the alloy is from 10 to 80 at %, the remainder being X, provided that the at % of platinum at the surface of the alloy is at least 25% greater than the at % of platinum in the bulk alloy is disclosed.

14 Claims, 3 Drawing Sheets

Anode Polarisation Data at 80°C
2M methanol

Anode Polarisation Data at 80°C
2M methanol

CATALYST

CROSS-REFERENCE TO RELATED APPLICATIONS

This application is the U.S. National Phase application of PCT International Application No. PCT/GB2008/050611, filed Jul. 22, 2008, and claims priority of British Patent Application No. 0714460.3, filed Jul. 25, 2007, both of which are incorporated herein by reference.

FIELD OF THE INVENTION

The present invention relates to a novel platinum alloy catalyst wherein the atomic percent of platinum at the surface of the alloy is greater than the atomic percent of platinum in the bulk alloy composition, and to the use of the catalyst, particularly in fuel cells, such as a direct methanol fuel cell.

BACKGROUND OF THE INVENTION

A fuel cell is an electrochemical cell comprising two electrodes separated by an electrolyte. A fuel, e.g. hydrogen, an alcohol such as methanol or ethanol, or a hydride, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Electrocatalysts for fuel oxidation and oxygen reduction are typically based on platinum or platinum alloyed with one or more other metals. The platinum alloy can be used as a high surface area metal black (an unsupported catalyst) or can be deposited onto a conductive carbon substrate (a supported catalyst).

Platinum is an expensive metal, so it is desirable to decrease the proportion of platinum in the electrocatalyst whilst maintaining or improving catalytic activity. The present inventors have sought to provide improved platinum catalysts having similar or improved activity to known catalysts but having a lower platinum content.

SUMMARY OF THE INVENTION

Accordingly, the present invention provides a platinum alloy catalyst PtX, wherein the atomic percent of platinum in the bulk alloy is from 5 to 50 at %, the remainder being X, characterised in that the atomic percent of platinum at the surface of the alloy is from 10 to 80 at %, the remainder being X, provided that the at % of platinum at the surface of the alloy is at least 25% greater than the at % of platinum in the bulk alloy.

DETAILED DESCRIPTION OF THE INVENTION

Figure 1:
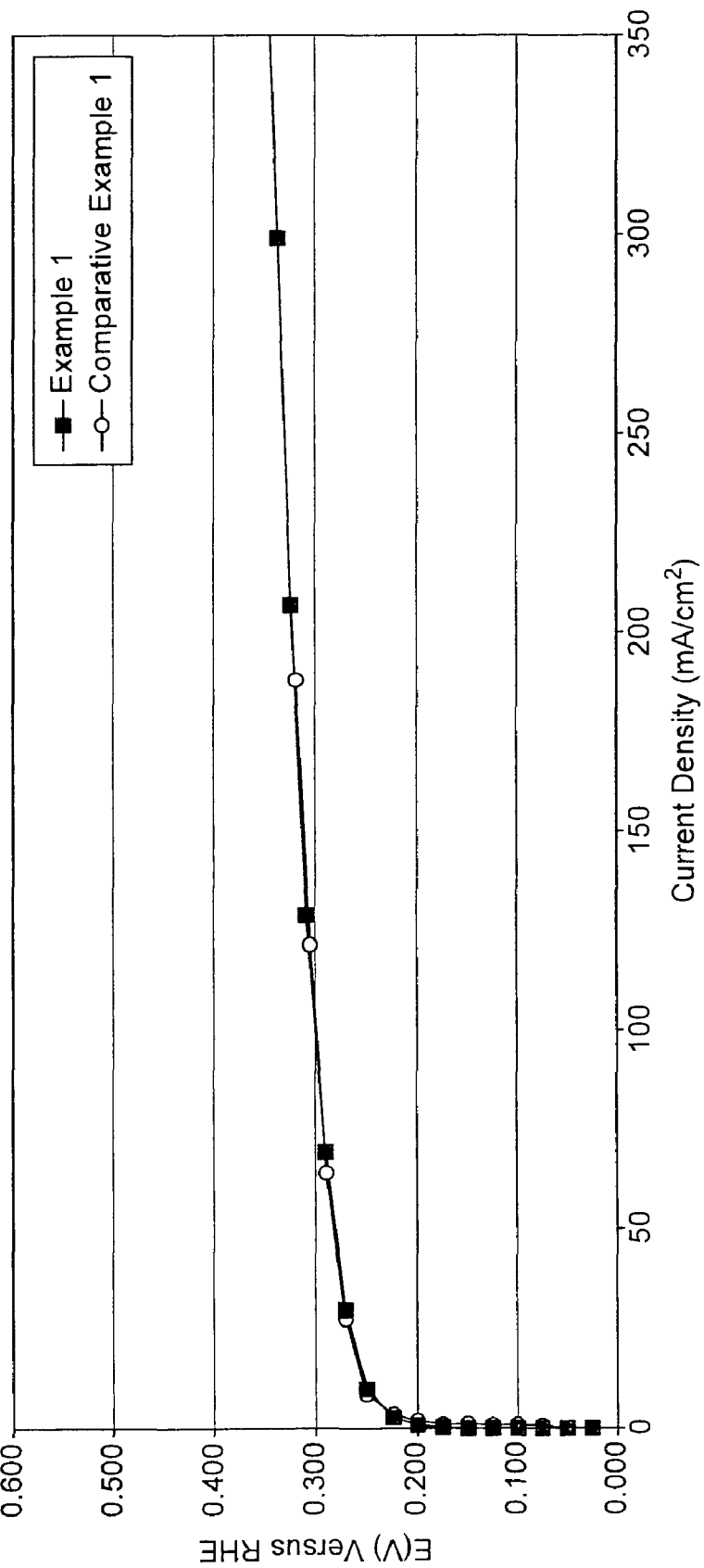
FIGS. 1-3 show anode half cell performance of membrane electrode assemblies containing electrocatalysts according to the invention and a comparative example.

Suitably, the atomic percent of platinum in the bulk alloy is from 5 to 45 at %, more suitably from 5 to 35 at %, more suitably from 10 to 35 at %, preferably from 20 to 35 at %. In one embodiment, the atomic percent of platinum in the bulk alloy is from 10 to 34 at %.

Suitably, the atomic percent of platinum at the surface of the alloy is from 20 to 60 at %, more suitably from 20 to 45 at %, preferably from 30 to 45 at %.

Suitably, the atomic percent of platinum at the surface is at least 25%, more suitably at least 50%, most suitably at least 65% and preferably at least 75% greater than the atomic percent of platinum in the bulk alloy (i.e. the platinum surface enrichment). Suitably, the platinum surface enrichment is in the range of from 25% to 500%, more suitably from 50% to 500%, most suitably from 65% to 500% and preferably from 75% to 500%.

The platinum surface enrichment is calculated using the following formula;

$$\frac{\text{Pt at \% (surface)} - \text{Pt at \% (bulk)}}{\text{Pt at \% (bulk)}}$$

In the present context, "at %" means atomic percentage, i.e. the percentage of Pt based on atoms or moles of the total of Pt and X; any additional non-metallic components (e.g. carbon) are not taken into consideration. By the term 'alloy' we mean that there is at least some intimate mixing between the Pt and X metals, but the intimate mixing is not necessarily uniform throughout the whole alloy particle. The atomic percent of Pt in the bulk alloy refers to the percentage of platinum in the entire catalyst, including the surface.

The atomic percent of Pt in the bulk alloy may be determined by standard procedures known to those skilled in the art; for example by wet chemical analysis digestion of the sample followed by inductively coupled plasma (ICP) emission spectroscopy. The atomic percent of Pt at the surface may be determined by X-ray photoelectron spectroscopy (XPS) or high sensitivity low energy ion scattering (HS-LEIS). HS-LEIS is a more surface sensitive technique than XPS and looks at only the very outermost surface layers; therefore, although both can be used to determine the atomic percent of Pt at the surface, the percent surface enrichment will differ slightly.

X is suitably one or more metals selected from the group consisting of the precious metals (other than platinum), i.e. ruthenium, rhodium, palladium, iridium, osmium, gold and silver; or transition metals. Particularly suitable metals include Ru, Pd, Rh, Os, Sn, Bi, Pb, Ir, Mo, Sb, W, Au, Re, or oxides thereof. More suitably, X is one or more of rhodium, iridium, osmium, ruthenium or tin. Preferably, X is ruthenium or tin or ruthenium and tin.

Due to the platinum surface enrichment of the alloy catalyst, the catalysts of the invention show superior catalytic activity than would be expected, in particular when used as an electrocatalyst in a fuel cell.

The catalyst of the invention may be prepared by a one-step sequential deposition of metal X followed by deposition of platinum and subsequently annealed in $H_2$ containing gas. The annealing step is suitably carried out in temperatures of up to 500° C.

The catalyst of the invention can be used in a fuel cell as an unsupported catalyst (i.e. as a metal black) or as a supported catalyst (i.e. dispersed on a support material); preferably the catalyst of the invention is used as a supported catalyst. Suitably the amount of the PtX alloy is 5-90 wt % based on the total weight of the supported catalyst, preferably 20-80 wt %. In a supported catalyst according to the present invention the PtX alloy is suitably dispersed on a conductive support material, for example a conductive carbon, such as oil furnace blacks, extra-conductive blacks, acetylene blacks and graphitised versions thereof. Exemplary carbons include Akzo Nobel Ketjen EC300J, Cabot Vulcan XC72R and Denka Acetylene Black. The catalyst of the invention preferably consists essentially of the PtX alloy dispersed on a conductive carbon material.

In a further aspect the present invention provides an electrode comprising a catalyst according to the invention. The catalyst may be unsupported or deposited on an electronically conducting substrate. The catalyst can be deposited onto a substrate using well known techniques, such as those disclosed in EP 0 731 520. The catalyst may be formulated into an ink, comprising an aqueous and/or organic solvent, optional polymeric binders and optional proton-conducting polymer. The ink may be deposited onto an electronically conducting substrate using techniques such as spraying, printing and doctor blade methods. Typical substrates include substrates based on carbon paper (e.g. Toray® paper available from Toray Industries, Japan or U105 or U107 paper available from Mitsubishi Rayon, Japan), woven carbon cloths (e.g. the MK series of carbon cloths available from Mitsubishi Chemicals, Japan) or non-woven carbon fibre webs (e.g. ELAT series of non-woven substrates available from E-TEK Inc, USA; H2315 series available from Freudenberg FCCT KG, Germany; or Sigracet® series available from SGL Technologies GmbH, Germany). The carbon paper, cloth or web is typically modified with a particulate material either embedded within the layer or coated onto the planar faces, or a combination of both. The particulate material is typically a mixture of carbon black and a polymer such as polytetrafluoroethylene (PTFE). Suitably the gas diffusion substrates are between 100 and 300 μm thick. Preferably there is a layer of particulate material such as carbon black and PTFE on the faces of the gas diffusion substrates that contact the electrocatalyst layers.

Alternatively, the substrate onto which the catalyst layer of the invention is applied may be a preformed gas diffusion electrode, either an anode or a cathode i.e. a gas diffusion substrate (which may be as described above) which already has applied thereto a catalyst layer.

In polymer electrolyte membrane (PEM) fuel cells, the electrolyte is a polymer electrolyte membrane. Electrocatalysts may be deposited onto one or both faces of the polymer electrolyte membrane to form a catalysed membrane. In a further aspect the present invention provides a catalysed membrane comprising a catalyst according to the invention deposited on a polymer electrolyte membrane. The catalyst can be deposited onto the membrane using well known techniques. The catalyst may be formulated into an ink and either directly deposited onto the membrane or deposited onto a decal blank for subsequent transfer to a membrane. One or more additional catalyst layers (for example Pt, PtRu) may subsequently be applied to the catalyst layer of the invention on the membrane to form a catalyst coated membrane having two or more catalyst layers. The one or more additional catalyst layers may be a catalyst layer according to the invention or may be a conventional catalyst layer as applied by conventional techniques, for example screen printing.

Alternatively, the membrane onto which the catalyst layer of the invention is applied may be a preformed catalyst coated membrane. Again, a multilayer structure will be obtained, but the catalyst layer of the invention will be the final layer on the membrane and therefore closest to the gas diffusion layer.

The membrane may be any membrane suitable for use in a fuel cell, for example the membrane may be based on a perfluorinated sulphonic acid material such as Nafion® (DuPont), Flernion® (Asahi Glass) and Aciplex® (Asahi Kasei); these membranes may be used unmodified, or may be modified to improve the high temperature performance, for example by incorporating an additive. Alternatively, the membrane may be based on a sulphonated hydrocarbon membrane such as those available from Polyfuel, JSR, FuMaTech and others. The membrane may be a composite membrane, containing the proton-conducting material and other materials that confer properties such as mechanical strength. For example, the membrane may comprise a proton-conducting membrane and a matrix of silica fibres, as described in EP 0 875 524 or the membrane may comprise an expanded PTFE substrate. Alternatively, the membrane may be based on polybenzimidazole doped with phosphoric acid and include membranes from developers such as PEMEAS, for example the Celtec®-P membrane which will operate in the range 120° C. to 180° C. and other newer developmental membrane such as the Celtec®-V membrane. The catalyst layer of the invention is also suitable for use with membranes that use charge carriers other than proton, for example OH$^-$ conducting membranes such as those available from Solvay, FuMaTech.

In a further embodiment of the invention, the substrate onto which the catalyst of the invention is applied is a transfer substrate. Accordingly, a further aspect of the present invention provides a transfer substrate comprising a catalyst of the invention. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polymer-coated paper such as polyurethane coated paper. The transfer substrate could also be a silicone release paper or a metal foil such as aluminium foil. The catalyst of the invention may then be transferred to a gas diffusion substrate, gas diffusion electrode, membrane or catalyst coated membrane by techniques known to those skilled in the art.

In PEM fuel cells, the polymer electrolyte membrane is interposed between two catalyst layers, and each catalyst layer is in contact with an electronically conducting substrate. This five-layer assembly is known as a membrane electrode assembly. A further embodiment of the invention provides a membrane electrode assembly (MBA) comprising a catalyst layer of the invention. The MEA may be made up in a number of ways including, but not limited to:

(i) an ion-conducting membrane may be sandwiched between two gas diffusion electrodes (one anode and one cathode), at least one of which is an electrode according to the present invention;

(ii) a catalyst-coated membrane coated on one side only by a catalyst layer may be sandwiched between (i) a gas diffusion substrate and a gas diffusion electrode, the gas diffusion substrate contacting the side of the membrane coated with the catalyst layer, or (ii) two gas diffusion electrodes, and wherein at least one of the catalyst layer and the gas diffusion electrode(s) is according to the present invention;

(iii) a catalyst-coated membrane coated on both sides with a catalyst layer may be sandwiched between (i) two gas diffusion substrates, (ii) a gas diffusion substrate and a gas diffusion electrode or (iii) two gas diffusion electrodes, and wherein at least one of the catalyst layer and the gas diffusion electrode(s) is according to the present invention.

The MEA may further comprise components that seal and/or reinforce the edge regions of the MEA for example as described in WO2005/020356. The MEA is assembled by conventional methods known to those skilled in the art.

The MEA may be used in a fuel cell stack, for example a proton exchange membrane fuel cell (PEMFC), a direct methanol fuel cell (DMFC), a high temperature fuel cell (for use at temperatures in the range of 100° C. to 250° C.) or an alkali fuel cell. Accordingly, a further aspect of the invention provides a fuel cell comprising a MEA of the invention. The MEA may be incorporated into the fuel cell using conventional methods.

Alternatively, an electrode of the invention may be used directly in a fuel cell, for example a phosphoric acid fuel cell wherein the electrolyte is liquid phosphoric acid in a supporting matrix, for example silicon carbide. Accordingly, a further aspect of the invention provides a fuel cell, in particular a phosphoric acid fuel cell, which comprises an electrode of the invention. Such fuel cells may be operated in the range of from 150° C. to 210° C.

The invention further provides a portable device (e.g. a portable power supply, a laptop computer or a mobile telephone) incorporating a fuel cell according to the invention.

EXAMPLES

The invention will now be further described with reference to the following examples, which are illustrative and not limiting of the invention.

Comparative Example 1

A commercially available PtRu catalyst (HiSPEC® 12100 from Johnson Matthey) was obtained.
Assay (weight % of bulk particle) 50% Pt, 25% Ru (50 at % of Pt in bulk)
Surface atomic percentage of Pt=61:39% (XPS); 46% (HS-LEIS)
Surface Pt enrichment compared to bulk=22% (XPS); no surface enrichment (HS-LEIS).

Example 1

Ketjen EC300J (1 g) was dispersed in water using a Silverson mixer. Sodium bicarbonate (8.41 g) was added and the carbon slurry was stirred and heated to the boil. After 30 mins boiling Ru and Pt salt solution was added and boiling was continued for a further 1.5 h. [Pt 1 g as $H_2PtCl_6$: 4 g, 25% Pt and Ru 2 g as $RuCl_3$ 4.94 g, 40.47% Ru]. The catalyst was recovered by filtration and washed on the filter bed. The material was dried overnight at 105 C. A sample of the dried material was fired in 5% $H_2/N_2$.
Yield (dried, unreduced)=5.06 g
Firing Conditions: 500° C. 30 mins,
Yield from 2 g after firing 1.57 g
Assay (weight % of bulk particle) 25.7% Pt, 44.8% Ru (23 at % of Pt in bulk)
Surface at % of Pt=36.9% (XPS)
Surface Pt enrichment compared to bulk=60% (XPS)

General Method for Examples 2-7

Ketjen EC300J (1 g) was dispersed in water (150 ml) using a Silverson mixer. The slurry was transferred to a beaker (if required with 50 ml additional water), fitted with temperature and pH probes and two feed inlet tubes connected to a pH control unit. The Ru salt was added to water and the volume made up to 100 ml. This solution was pumped into the stirred carbon slurry at 10 ml/min together with NaOH at variable rate to maintain the pH as close as possible between 5.0 and 6.0 (initial pH). When the addition was complete, the temperature was optionally raised to a maximum of 100° C., the slurry stirred and the Pt salt was added. NaOH was added to maintain the pH between 5.0 and 7.0 (final pH). The slurry was stirred. Once the reaction was complete, the catalyst was recovered by filtration and washed on the filter bed. The material was dried overnight at 105° C. A sample of the dried material was fired in 5% $H_2/N_2$.

Example 2

Ru 2 g as $RuCl_3$: 4.94 g, 40.47% Ru
Pt 1 g as Pt nitrate: 6.09 g, 16.41% Pt
NaOH: 0.5M
pH (initial) 5.0; pH (final) 5.0
Yield (dried, unreduced)=5.04 g
Firing conditions: 200° C. for one hour
Yield from 2 g sample after firing=1.55 g
Assay (weight % of bulk particle) 21.5% Pt, 44.7% Ru (20 at % of Pt in bulk)
Surface atomic percentage of Pt=38.8% (XPS)
Surface Pt enrichment compared to bulk=94% (XPS)

Example 3

Ru 2 g as Ru nitrosyl nitrate: 15.37 g, 13.01% Ru
Pt 1 g as Pt nitrate: 6.09 g, 16.41% Pt
NaOH: 1.0 M
pH (initial) 6.0; pH (final) 7.0
Yield (dried, unreduced)=5.48 g
Firing conditions: 200° C. for one hour
Yield from 2 g sample after firing=1.4 g
Assay (weight % of bulk particle) 22.7% Pt, 44.4% Ru (21 at % of Pt in bulk)
Surface atomic percentage of Pt=36.3% (XPS)
Surface Pt enrichment compared to bulk=73% (XPS)

Example 4

Ru 2 g as $RuCl_3$: 4.94 g, 40.47% Ru
Pt 1 g as $K_2PtCl_4$ 46.56% Pt
NaOH: 0.5M (first addition) and 1.0M (second addition)
pH (initial) 6.0; pH (final) 7.0
Yield (dried, unreduced)=5.10 g
Firing conditions: 200° C. for one hour
Yield from 2 g sample after firing=1.64 g
Assay (weight % of bulk particle) 20.5% Pt, 42.9% Ru (21 at % of Pt in bulk)
Surface atomic percentage of Pt=39:6% (XPS); 37% (HS-LEIS)
Surface Pt enrichment compared to bulk=89% (XPS); 76% (HS-LEIS)

Example 5

Ru 2 g as $RuCl_3$: 4.94 g, 40.47% Ru
Pt 1 g as Pt nitrate: 6.09 g, 16.41% Pt
NaOH: 0.5M
pH (initial) 5.0; pH (final) 5.0
Yield (dried, unreduced)=5.04 g
Firing conditions: 500° C. for 30 minutes.
Yield from 1.5 g sample after firing=1.11 g.
Assay (weight % of bulk particle) 21.5% Pt, 44.7% Ru (20 at % of Pt in bulk)
Surface atomic percentage of Pt=38.8% (XPS)
Surface Pt enrichment compared to bulk=94% (XPS)

Example 6

Ru 2.47 g as $RuCl_3$: 6.19 g, 39.9% Ru
Pt 0.53 g as $K_2PtCl_4$: 1.13 g 46.71% Pt

NaOH 0.5 (first addition) and 1.0M (second addition)
pH (initial) 6.0; pH (final) 7.0
Yield (dried, unreduced)=4.98 g
Firing Conditions: 200° C. for 30 minutes
Yield from 2 g after firing=1.55 g
Assay (weight % of bulk particle) 12.7% Pt, 54.0% Ru (10 at % Pt in bulk)
Surface atomic percentage of Pt=19% (HS-LEIS)
Surface Pt enrichment compared to bulk=90% (HS-LEIS)

Example 7

Ru 1.64 g as $RuCl_3$: 4.11 g, 39.9% Ru
Pt 1.36 g as $K_2PtCl_4$: 2.92 g 46.55% Pt
NaOH 0.5 (first addition) and 1.0M (second addition)
pH (initial) 6.0; pH (final) 7.0
Yield (dried, unreduced)=5.07 g
Firing Conditions: 200° C. 30 minutes
Assay (weight % of bulk particle) 29.7% Pt, 34.3% Ru (30 at % Pt in bulk)
Surface atomic percentage of Pt=50% (HS-LEIS)
Surface Pt enrichment compared to bulk=67% (HS-LEIS)

Example 8

Anode Polarisation Data

Figure 2:
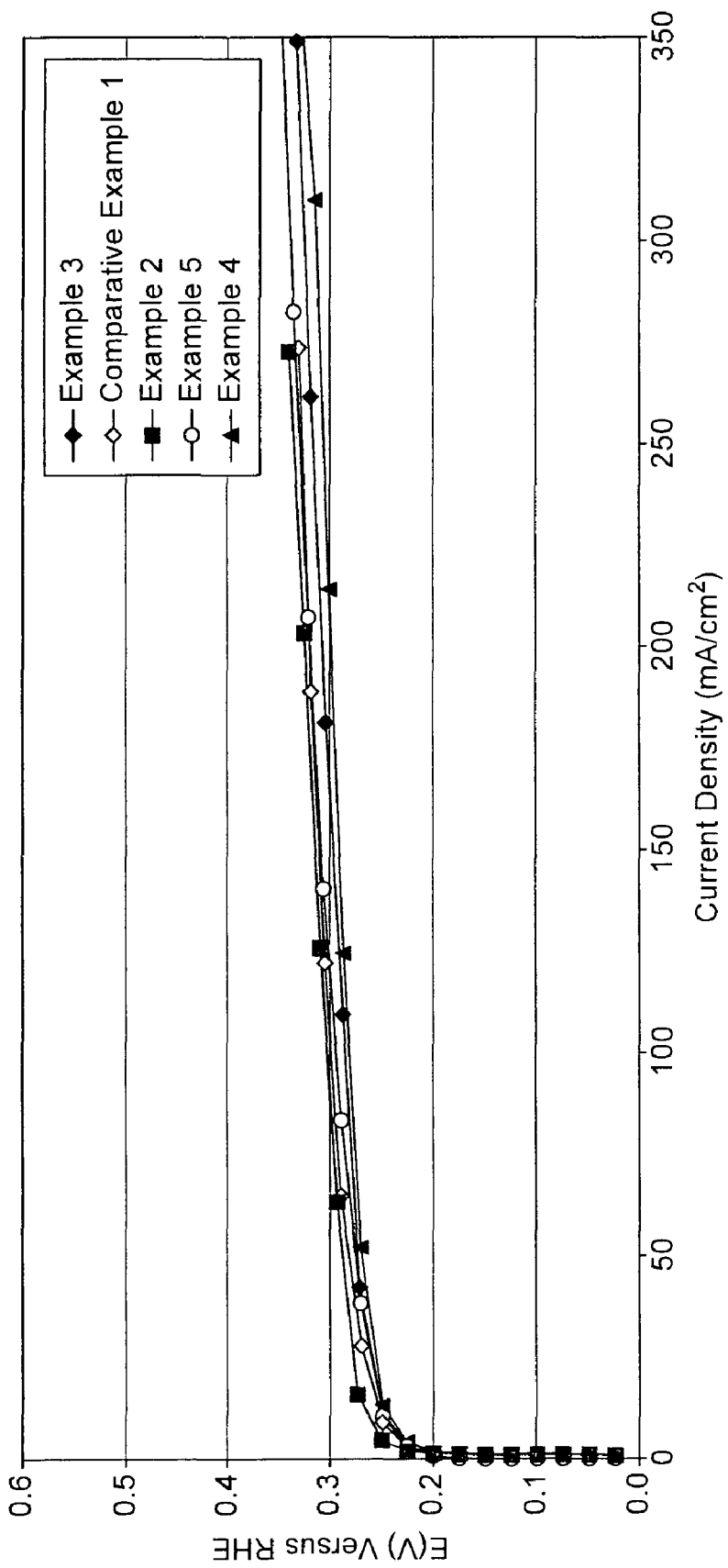
Figure 3:
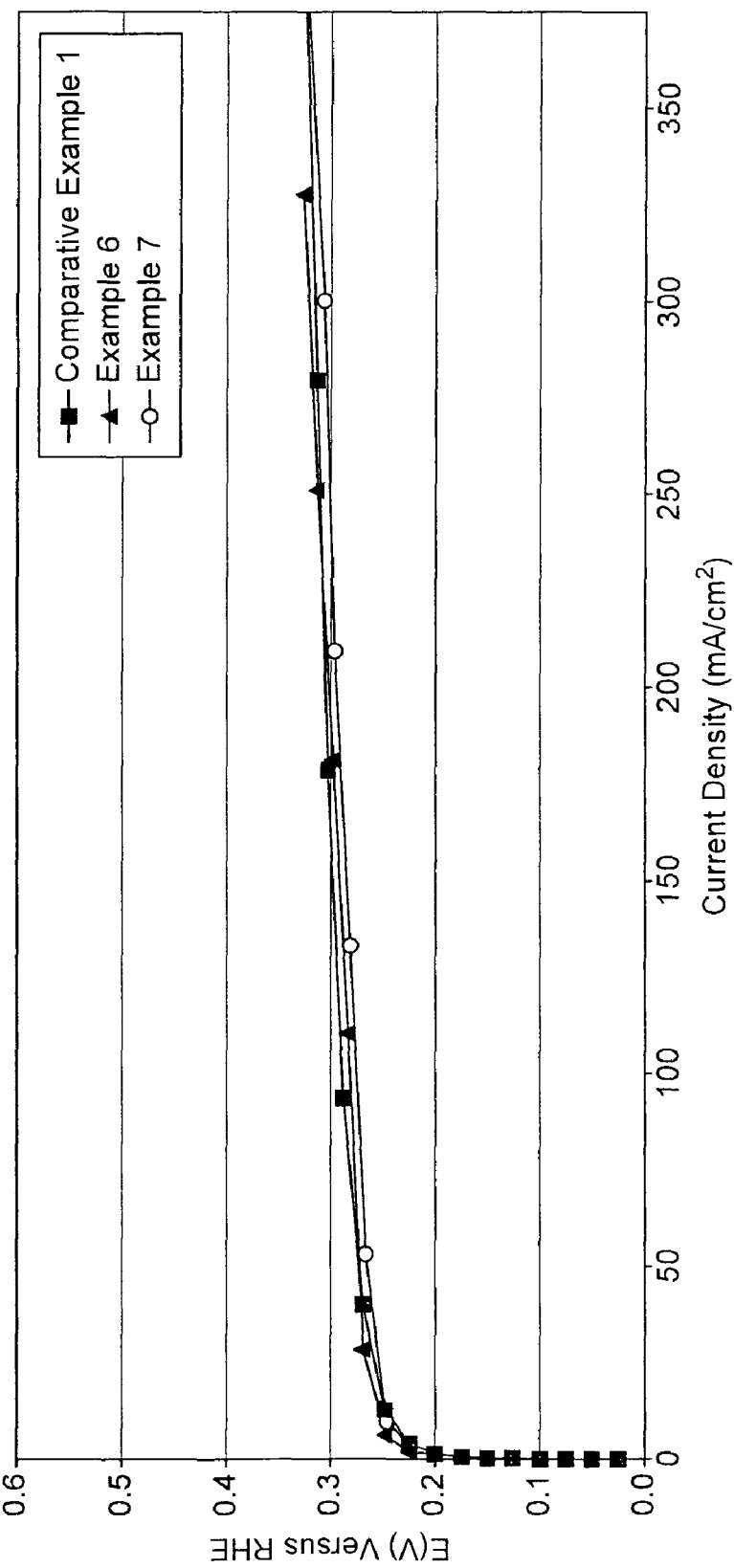

The catalysts prepared in Comparative Example 1 and Examples 1 to 7 were used to prepare membrane electrode assemblies. The catalysts were formulated into inks using the techniques outline in EP 0 731 520 and used to prepare anode electrocatalyst layers at a total metal loading (Pt+Ru) of 1.5 mg/cm$^2$. The cathode electrocatalyst layers contained standard Pt black electrocatalysts. The membrane electrode assemblies were tested in a direct methanol test cell. FIGS. 1 to 3 shows anode half cell performance of membrane electrode assemblies containing the electrocatalysts of Examples 1 to 7 and Comparative Example 1 at 80° C. The performance of the MEAs containing the Examples of the invention is better than or comparable to that of the Comparative Example 1, even though the Examples of the invention contain significantly less platinum.

The invention claimed is:
1. A platinum alloy catalyst comprising a bulk alloy PtX, wherein the atomic percent of platinum in the bulk alloy is from 5 to 50 at %, the remaining at % being X, wherein the atomic percent of platinum at the surface of the alloy catalyst is from 10 to 80 at %, the remainder being X, provided that the at % of platinum at the surface of the alloy catalyst is at least 25% greater than the at % of platinum in the bulk alloy.
2. A platinum alloy catalyst according to claim 1, wherein X is one or more metals selected from the group consisting of precious metals ruthenium, rhodium, palladium, iridium, osmium, gold and silver, and transition metals.
3. A platinum alloy catalyst according to claim 1, wherein X is ruthenium or tin or ruthenium and tin.
4. A platinum alloy catalyst according to claim 1, wherein the catalyst is unsupported or supported on a dispersed support material.
5. A platinum alloy catalyst according to claim 4, wherein the catalyst is supported on a dispersed support material.
6. A platinum alloy catalyst according to claim 1, wherein the catalyst consists essentially of the PtX alloy dispersed on a conductive carbon support.
7. An electrode comprising a catalyst according to claim 1.
8. A catalysed membrane comprising a catalyst according to claim 1.
9. A transfer substrate comprising a catalyst according to claim 1.
10. A membrane electrode assembly comprising a catalyst according to claim 1.
11. A fuel cell comprising a membrane electrode assembly according to claim 10.
12. A fuel cell comprising an electrode according to claim 7.
13. A portable device comprising a fuel cell according to claim 11.
14. A portable device comprising a fuel cell according to claim 12.

* * * * *